United States Patent
Wang et al.

(10) Patent No.: US 10,664,734 B2
(45) Date of Patent: May 26, 2020

(54) HIGH-FREQUENCY-NFC-BASED PRODUCT TRACEABILITY AND ANTI-COUNTERFEITING TAG

(71) Applicant: Graphene Security Limited, Manchester (GB)

(72) Inventors: Guo-Hao Wang, Jimo (CN); Xiuchen Yan, Nanjing (CN); Chung-Ping Lai, Hsinchu County (TW)

(73) Assignee: GRAPHENE SECURITY LIMITED, Manchester (GB)

( * ) Notice: Subject to any disclaimer, the term of this patent is extended or adjusted under 35 U.S.C. 154(b) by 5 days.

(21) Appl. No.: 16/167,520

(22) Filed: Oct. 22, 2018

(65) Prior Publication Data

US 2020/0125908 A1   Apr. 23, 2020

(51) Int. Cl.
*G06K 19/07*   (2006.01)
*G06K 19/073*   (2006.01)
*G06K 19/077*   (2006.01)

(52) U.S. Cl.
CPC ... *G06K 19/0723* (2013.01); *G06K 19/07345* (2013.01); *G06K 19/07381* (2013.01); *G06K 19/07758* (2013.01); *G06K 19/07779* (2013.01)

(58) Field of Classification Search
CPC ................................................ G06K 19/0723
USPC ...................... 235/492, 488; 340/10.1, 572.3
See application file for complete search history.

(56) References Cited

U.S. PATENT DOCUMENTS

| | | | |
|---|---|---|---|
| 2007/0205900 A1* | 9/2007 | Pretorius | G06K 19/07372 340/572.8 |
| 2013/0033364 A1* | 2/2013 | Raz | G06K 19/0716 340/10.1 |
| 2013/0270348 A1* | 10/2013 | Zenz | H01Q 1/2225 235/488 |
| 2014/0263659 A1* | 9/2014 | Kervinen | G06K 19/027 235/488 |
| 2017/0323125 A1* | 11/2017 | Yang | G06K 7/00 |

\* cited by examiner

*Primary Examiner* — Allyson N Trail
(74) *Attorney, Agent, or Firm* — Chun-Ming Shih; LanWay IPR Services

(57) ABSTRACT

The NFC-based tag includes a substrate, a first and second coils formed on the substrate and an NFC chip fixed on the substrate. A status code whose default value is 0 is stored in memory of the NFC chip. The first coil is connected to the NFC chip and serves as an antenna thereof. The NFC chip communicates with an NFC reader through the first coil. The NFC reader can read or write the status code through the first coil. The NFC chip has an IO contact and a grounding contact. The IO contact connects to the grounding contact via the second coil. The second coil serves as an EAS coil. The IO contact is connected to the grounding contact through the second coil to form a closed loop. The NFC reader rewrites the status code to be 1 irreversibly when the second coil is broken or has finished checkout.

8 Claims, 6 Drawing Sheets

HIGH-FREQUENCY-NFC-BASED PRODUCT TRACEABILITY AND ANTI-COUNTERFEITING TAG

TECHNICAL FIELD

The invention relates to radio frequency identification (RFID), particularly to high-frequency-NFC-based anti-counterfeiting tags and systems using the same.

RELATED ART

In open-shelf type markets or malls, electronic article surveillance (EAS) systems are usually utilized to monitor and prevent shoplifting. The EAS system is essentially composed of a detector, a deactivator and an EAS tag. Usually, the detector is disposed at an exit or entrance. Current detectors are also known as security gates. Detectors serve to detect if products without checkout are illegally carried about. Products with EAS tags should be deactivated by the deactivator after having finished checkout and then they can be carried about to legally pass the security gate.

Electronic article surveillance is a technological method for preventing shoplifting from retail stores, pilferage of books from libraries or removal of properties from office buildings. Special tags are fixed to merchandise or books. These tags are removed or deactivated by the clerks when the item is properly bought or checked out. At the exits of the store, a detection system sounds an alarm or otherwise alerts the staff when it senses active tags. These tags are essentially an LC tank circuit that has a resonance peak anywhere from 1.75 MHz to 9.5 MHz. The standard frequency for retail use is 8.2 MHz. Sensing is achieved by sweeping around the resonant frequency and detecting the dip. The EAS tags have no chip. Detection is achieved by sensing harmonics and sum or difference signals generated by the non-linear magnetic response of the material under a mixture of low-frequency (in the 10 Hz to 1000 Hz range) magnetic fields. Demagnetization can be done only by physical destruction or manual removal. Thus, demagnetization boards are disposed on checkout counters of most stores using EAS systems.

NFC (Near Field Communication) tags are mostly used for anti-counterfeiting. These tags are attached on merchandise by factories. The NFC derives from RFID (Radio Frequency Identification). NFC is a close-range wireless communication technology, which allows contactless data exchange between electronic devices. An NFC-based anti-counterfeiting system is essentially composed of an NFC system, a communication network and an anti-counterfeiting system. The NFC system includes an NFC tag and an NFC reader (supports smartphones with an NFC function). There is a unique code of product and a digital signature of manufacture. Authenticity, place of origin or source of product can be identified by using a smartphone to scan the NFC tag on a product and connecting the anti-counterfeiting system via the communication network. However, the NFC tags do not have an anti-tearing function. As a result, many NFC tags are recovered and then attached on fake products. This cause serious damage to manufactures, stores and customers.

SUMMARY OF THE INVENTION

An object of the invention is to provide a high-frequency-NFC-based product traceability and anti-counterfeiting tag and a product traceability and anti-counterfeiting system including the tag.

To accomplish the above object, the high-frequency-NFC-based product traceability and anti-counterfeiting tag of the invention includes a substrate, a first coil formed on the substrate, a second coil formed on the substrate, and an NFC chip fixed on the substrate. A digital signature, product information and a status code whose default value is zero (0) are stored in memory of the NFC chip. The first coil is electrically connected to the NFC chip. The first coil serves as an antenna of the NFC chip. The NFC chip communicates with an NFC reader through the first coil. The NFC reader is capable of reading or writing the status code of the NFC chip through the first coil. The NFC chip has an IO contact and a grounding contact. The IO contact is electrically connected to the grounding contact via the second coil to form a closed loop. The status code keeps at zero (0) when the second coil is not broken to maintain a closed loop. The reader rewrites the status code to be one (1) by way of communication with the NFC chip when the second coil is broken or becomes an open loop. The status code becomes unwritable after the status code has been rewritten to be one (1).

The invention also provides a high-frequency-NFC-based product traceability and anti-counterfeiting system which includes a product traceability and anti-counterfeiting tag, an NFC reader and a detector. The product traceability and anti-counterfeiting tag includes a substrate, a first coil formed on the substrate, a second coil formed on the substrate and an NFC chip fixed on the substrate. A digital signature, product information and a status code whose default value is zero (0) are stored in memory of the NFC chip. The first coil is electrically connected to the NFC chip. The first coil serves as an antenna of the NFC chip. The NFC chip communicates with an NFC reader through the first coil. The NFC reader is capable of reading or writing the status code of the NFC chip through the first coil. The NFC chip has an IO contact and a grounding contact. The IO contact is electrically connected to the grounding contact via the second coil to form a closed loop. The status code keeps at zero (0) when the second coil is not broken to maintain a closed loop. The reader rewrites the status code to be one (1) by way of communication with the NFC chip when the second coil is broken or becomes an open loop. The status code becomes unwritable after the status code has been rewritten to be one (1). The NFC reader communicates with the NFC chip through the first coil and is capable of reading or writing the status code. The detector is used for detecting the second coil and is capable of raising an alarm when the second coil is a closed loop.

Wherein the second coil is an EAS coil.

Wherein both the first coil and the second coil are separately formed on the same side of the substrate.

Wherein the NFC reader sends a command to the NFC chip to disconnect the second coil to be an open loop when the NFC reader rewrites the status code to be one by way of communication with the NFC chip.

Wherein when the second coil is not broken to maintain the closed loop, the IO contact is grounded to form a low level and the NFC reader rewrites the status code to be one by way of communication with the NFC chip, the NFC reader sends a command to the NFC chip 40 to switch an output switch of the IO contact to be a high level and the IO contact disconnects the grounding contact.

Advantages of the invention include:

1) The high-frequency-NFC-based anti-counterfeiting tag attached on a product can implement both product traceability and anti-counterfeiting.

2) By integrating an NFC tag and an EAS coil/tag to be one piece, product traceability is available for customers and manufactures and the process of attaching EAS tags can be saved.

3) A status code will be rewritten to be one (1) and become unwritable when the second coil serving as an EAS coil. This can prevent the tags from recovering because the status code still keeps at one (1) which means problematic.

4) The second antenna will be disconnected by the NFC chip when having checked out. In other words, the anti-counterfeiting function is released while a product is being checked out. An additional operation of demagnetization or releasing the anti-counterfeiting mechanism is not required. This can effectively increase efficiency of cashiers.

DETAILED DESCRIPTION OF THE INVENTION

Figure 1:
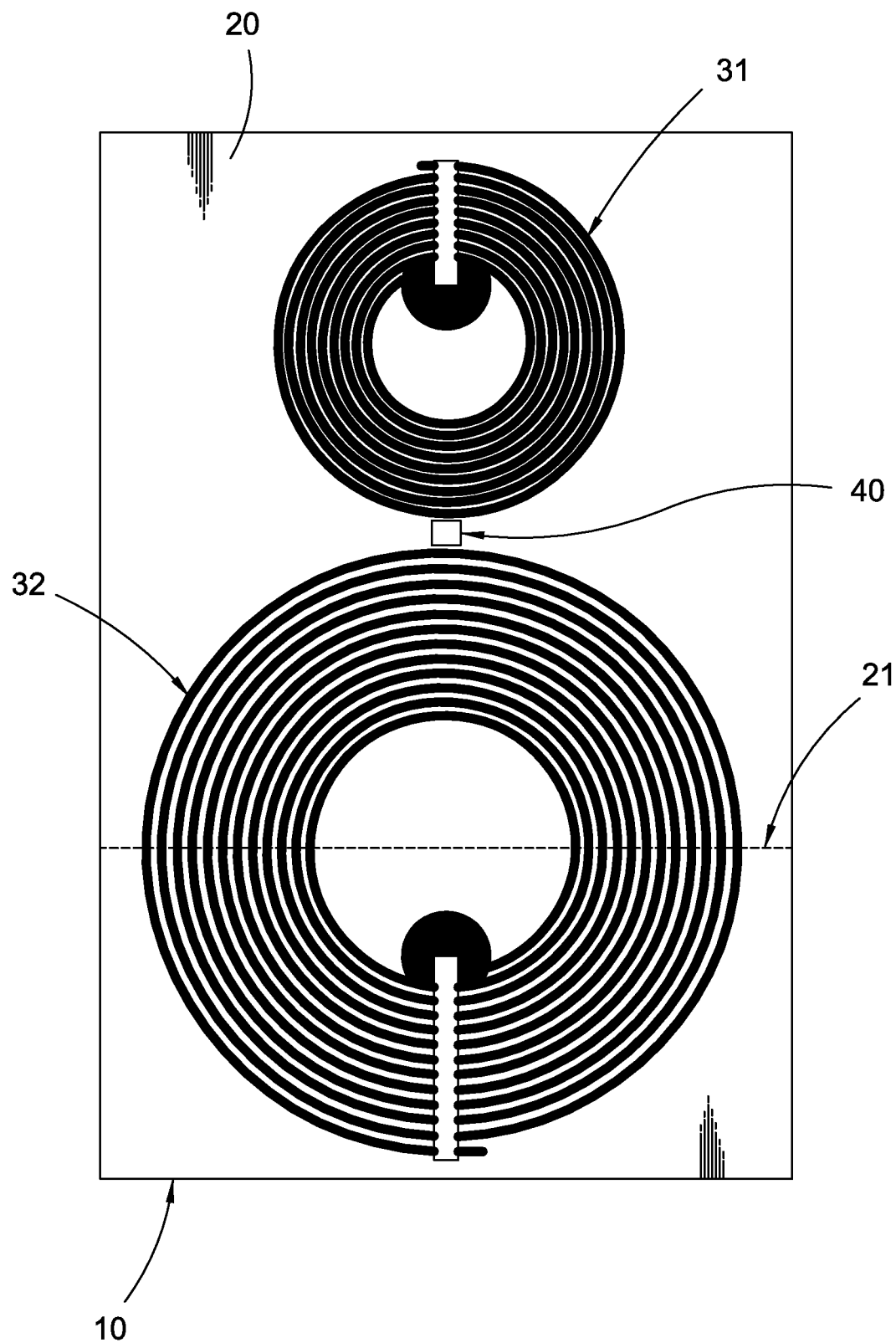
FIG. 1 is a structural schematic view of the product traceability and high-frequency-NFC-based anti-counterfeiting tag of the invention.

Positional relationship mentioned in the following description, including up, down, left and right, is based upon the directions shown in the drawings if no particular indication.

Please refer to FIG. 1, which is a structural schematic view of the high-frequency-NFC-based product traceability and anti-counterfeiting tag of the invention. The high-frequency-NFC-based product traceability and anti-counterfeiting tag 10 includes a substrate 20, a first coil 31 and a second coil 32 formed on the substrate 20, and an NFC chip 40 fixed on the substrate 20. The substrate can be made of paper or a plastic film. A digital signature, product information and status code whose default value is zero (0) are stored in memory of the NFC chip 40. Customers or dealers can use an NFC reading device or a smartphone with an NFC function to read the digital signature and/or product information for product traceability and anti-counterfeiting.

Figure 2:
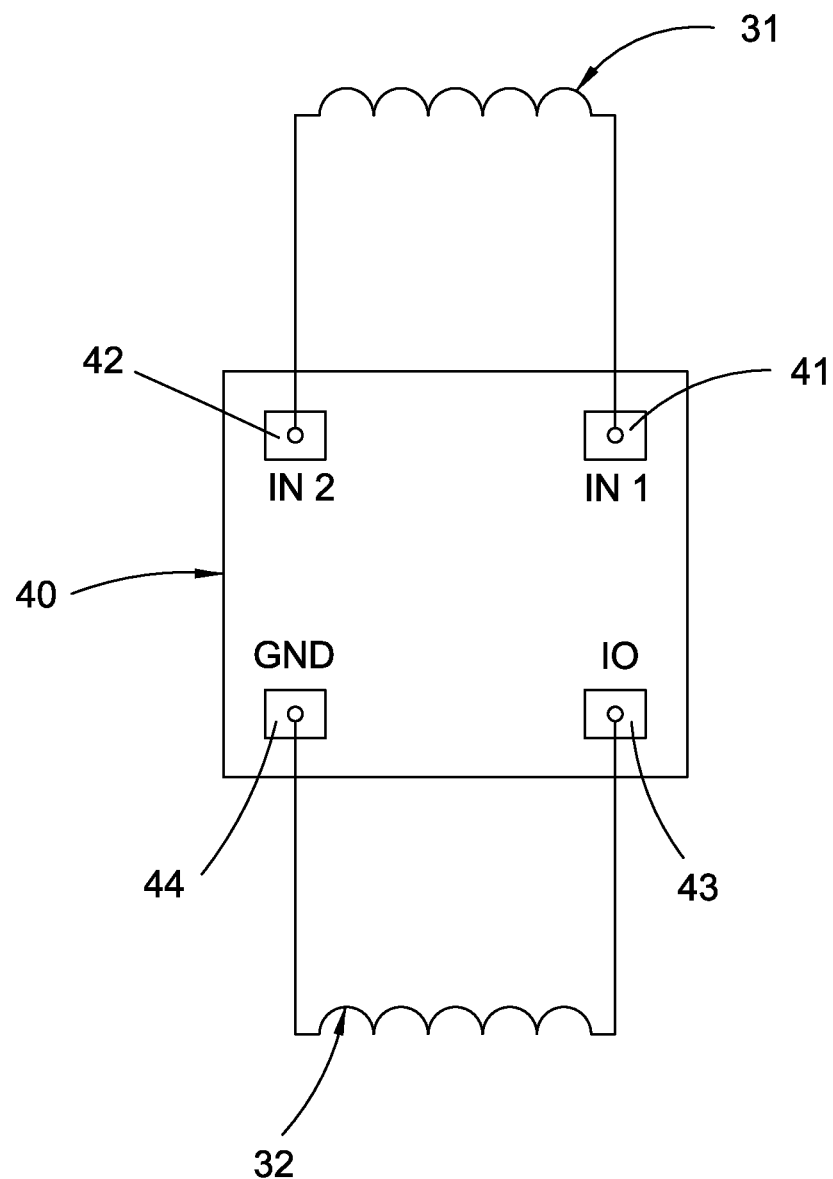
FIG. 2 is an equivalent circuit diagram of the high-frequency-NFC-based product traceability and anti-counterfeiting tag of the invention, which shows the antenna contacts, 10 contact and grounding contact.
Figure 3:
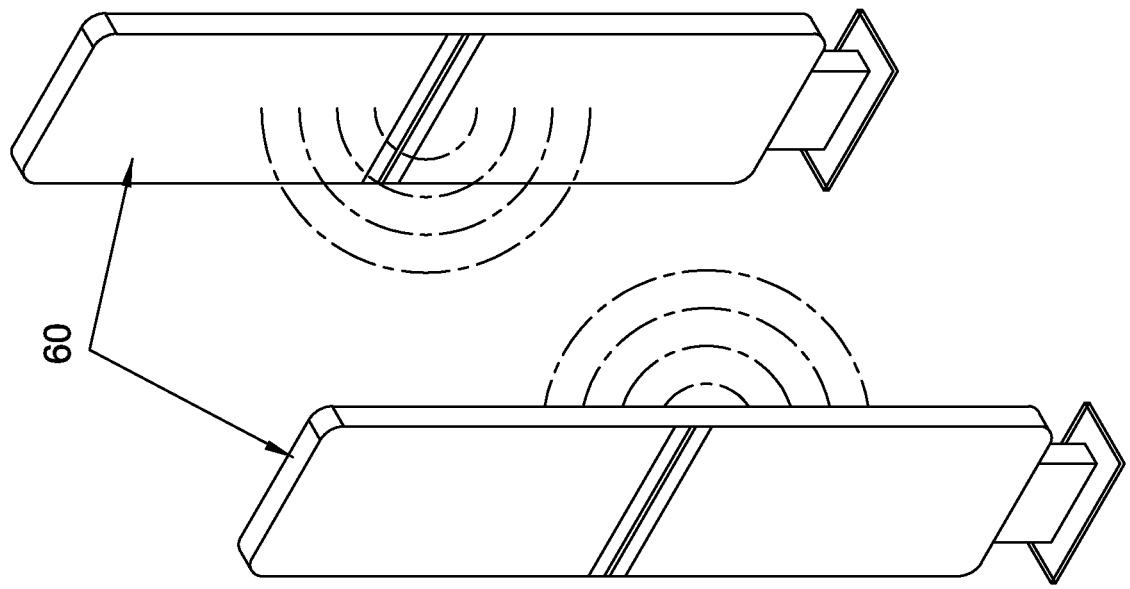
FIG. 3 is a schematic view of the high-frequency-NFC-based product traceability and anti-counterfeiting system of the invention.
Figure 3:
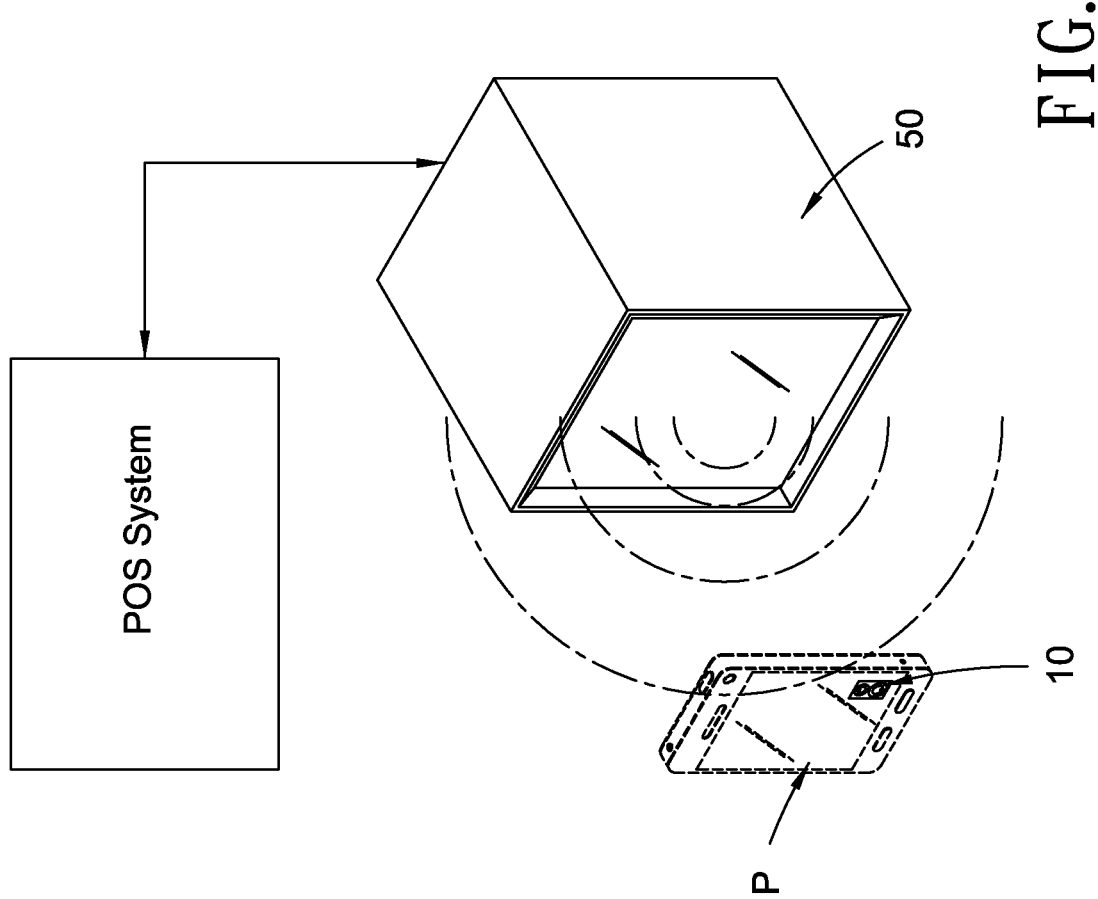

The first coil 31 is electrically connected to the NFC chip 40. As shown in FIG. 2, the first coil 31 electrically connects to antenna contacts 41, 42 to serve as an antenna of the NFC chip 40. The NFC chip 40 is able to communicate with an NFC reader 50 through the first coil 31 as shown in FIG. 3. The NFC reader 50 is capable of reading or writing the status code of the NFC chip 40 through the first coil 31. The NFC chip 40 has an IO (input/output) contact 43 and a grounding contact 44. The IO contact 43 is electrically connected to the grounding contact 44 via the second coil 32 to form a closed loop. An embodiment of the second coil 32 is an EAS coil. In other words, The EAS system will be triggered to raise an alarm when the second coil 32 without demagnetization passes an anti-counterfeiting gate. The status code keeps at zero (0) when the second coil 32 is not broken to maintain a closed loop. The NFC chip 40 rewrites the status code to be one (1) when the second coil 32 is broken or becomes an open loop. The status code becomes unwritable after the status code has been rewritten to be one (1).

As a preferred embodiment of the traceability and anti-counterfeiting tag of the invention, both the first coil 31 and the second coil 32 are separately formed on the same side of the substrate 20. The second coil 32 is breakable. For example, the substrate 20 may be provide with a tearing line 21 for tearing or separating. The tearing line 21 crosses the second coil 32. As a result, the second coil 32 can be broken when the substrate 20 is torn or separated along the tearing line 21.

As a preferred embodiment of the traceability and anti-counterfeiting tag of the invention, the NFC reader 50 sends a command to the NFC chip 40 to disconnect the second coil 32 (i.e., EAS coil) to form an open loop. In an embodiment, when the second coil 32 is not broken to maintain the closed loop, the IO contact 43 is grounded to form a low level, the NFC reader 50 sends a command to the NFC chip 40 to switch an output switch of the IO contact 43 to be a high level and the IO contact 43 disconnects the grounding contact 44 while the NFC reader 50 is rewriting the status code to be one (1) by way of communication with the NFC chip 40. As a result, the second coil 32 is disconnected through the NFC chip 40 when a product P has checked out. That is, both checkout and releasing the anti-counterfeiting mechanism can be simultaneously finished. An additional operation of demagnetization or releasing the anti-counterfeiting mechanism is not required. This can effectively increase efficiency of cashiers.

Please refer to FIG. 3, which is a schematic view of the high-frequency-NFC-based product traceability and anti-counterfeiting system of the invention. The system includes a product traceability and anti-counterfeiting tag, an NFC reader 50 and a detector 60.

The NFC reader 50 communicates with the NFC chip 40 through the first coil 31 and is capable of reading or writing the status code. As a preferred embodiment of the traceability and anti-counterfeiting system of the invention, the NFC reader 50 further connects to a POS (point of sales) system to implement synchronous demagnetization or releasing the anti-counterfeiting mechanism of the product traceability and anti-counterfeiting tag 10 when a product P has checked out. The detector 60 is used for detecting the second coil 32 and is capable of raising an audio or light alarm when the second coil 32 is a closed loop.

Figure 4:
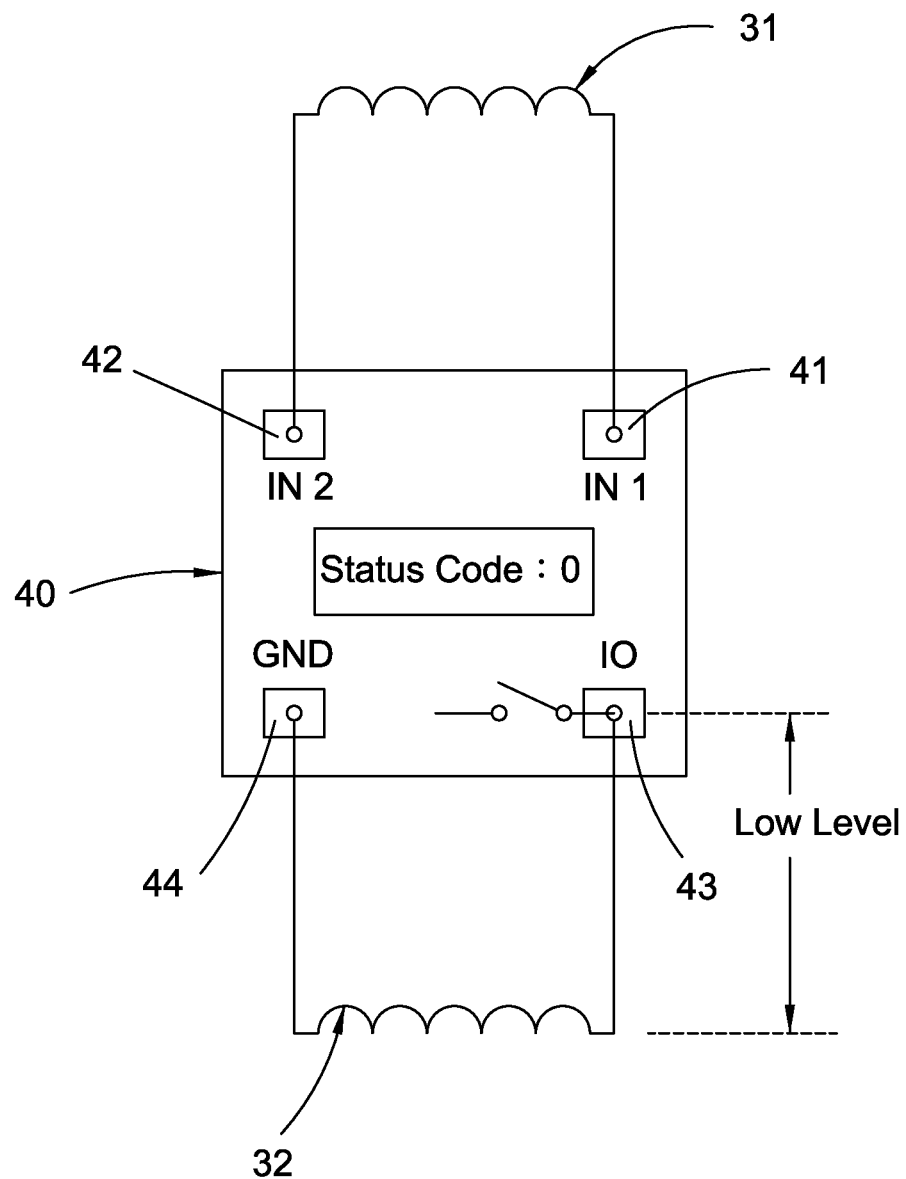
FIG. 4 is a schematic view of a using status of the high-frequency-NFC-based product traceability and anti-counterfeiting tag of the invention.
Figure 5:
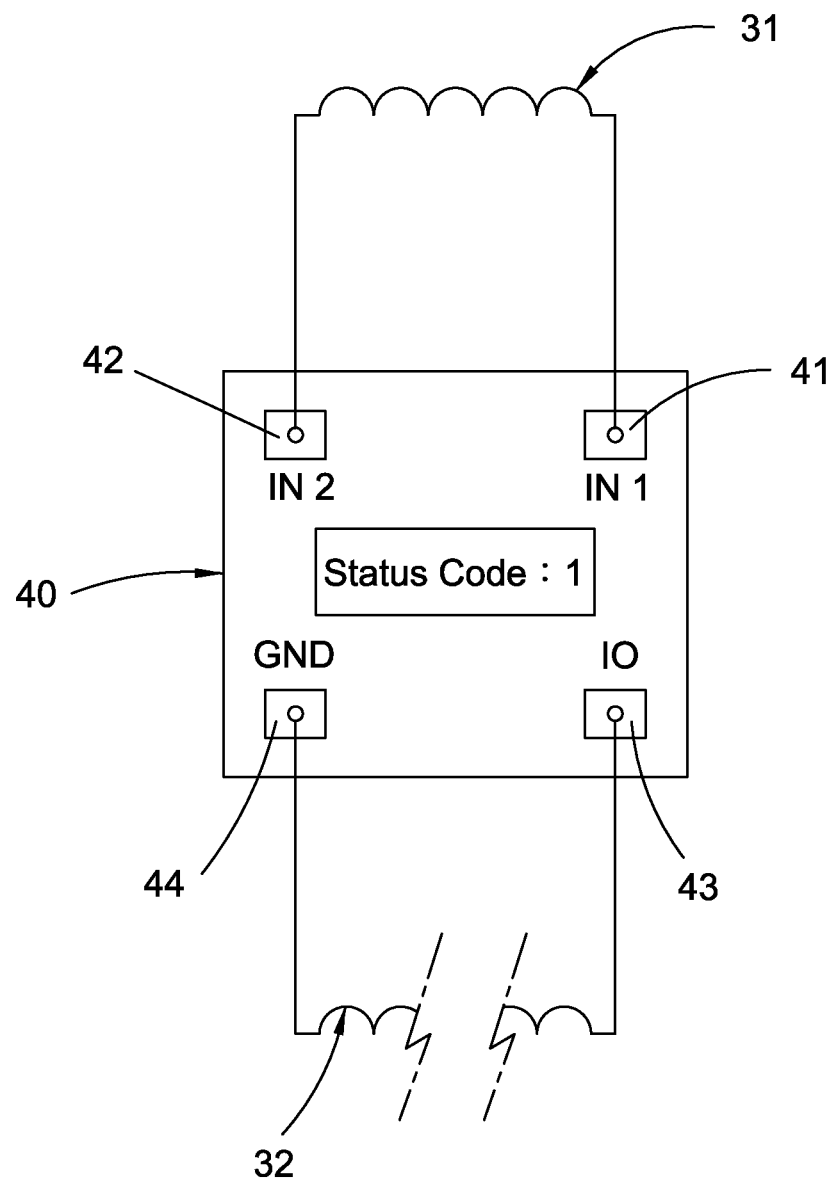
FIG. 5 is a schematic view of another using status of the high-frequency-NFC-based product traceability and anti-counterfeiting tag of the invention.
Figure 6:
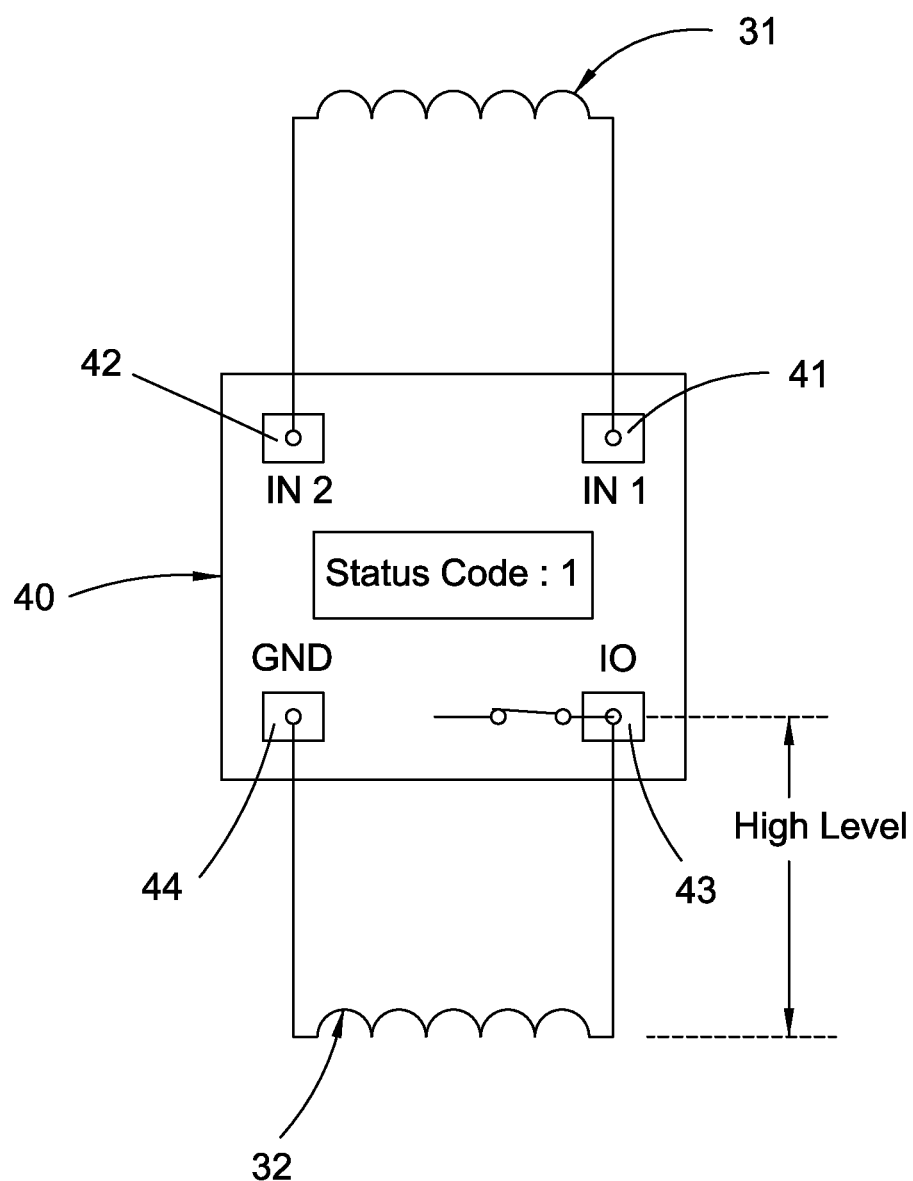
FIG. 6 is a schematic view of still another using status of the high-frequency-NFC-based product traceability and anti-counterfeiting tag of the invention.

Please refer to FIGS. 4-6, which are schematic views of various using statuses of the high-frequency-NFC-based product traceability and anti-counterfeiting tag of the invention. FIG. 4 depicts a first status where a product P with the product traceability and anti-counterfeiting tag 10 is not checked out yet, the second coil 32 as an EAS coil is not broken or demagnetized, and the status code is zero (default value).

FIG. 5 depicts a second status where the second coil 32 as an EAS coil has been broken to be an open loop, the IO contact 43 cannot be electrically connected to the grounding contact 44 through the second coil 32, the NFC chip 40 detects that the IO contact 43 is floating, and the status code is rewritten to be one by the NFC chip 40.

FIG. 6 depicts a third status where the product P has been checked out, the NFC reader 50 sends a command to the NFC chip 40 to disconnect the second coil 32 (i.e., the EAS coil) to form an open loop, and the NFC chip 40 rewrites the status code to be one and the status becomes unwritable. In other words, the status code becomes unchangeable after the NFC reader 50 sends a command to the NFC chip 40 to change the status code as one. The status code is still one even if the tag 10 is reused. As a result, the tag 10 has an anti-reuse function. Status code "1" means the product having been checked out or the second coil 32 having been broken. If the tag 10 of the invention is reused, dealers or customers can know if a product is problematic by reading the status code.

The invention integrates an NFC tag and an EAS coil/tag to be one piece to implement product traceability, anti-tearing and anti-counterfeiting. The tag 10 has had the EAS function, so the process of attaching EAS tags can be saved.

It will be appreciated by persons skilled in the art that the above embodiment has been described by way of example only and not in any limitative sense, and that various alterations and modifications are possible without departure from the scope of the disclosed example as defined by the appended claims.

What is claimed is:

1. A high-frequency-NFC-based product traceability and anti-counterfeiting tag comprising:
   a substrate;
   a first coil formed on the substrate;
   a second coil formed on the substrate; and
   an NFC chip fixed on the substrate;
   wherein a digital signature, product information and a status code whose default value is zero (0) are stored in memory of the NFC chip, the first coil is electrically connected to the NFC chip, the first coil serves as an antenna of the NFC chip, the NFC chip communicates with an NFC reader through the first coil, the NFC reader is capable of reading or writing the status code of the NFC chip through the first coil, the NFC chip has an IO contact and a grounding contact, the IO contact is electrically connected to the grounding contact via the second coil to form a closed loop, the status code keeps at zero (0) when the second coil is not broken to maintain a closed loop, the reader rewrites the status code to be one (1) by way of communication with the NFC chip when the second coil is broken or becomes an open loop, and the status code becomes unwritable after the status code has been rewritten to be one (1),
   wherein the NFC reader sends a command to the NFC chip to disconnect the second coil to be an open loop when the NFC reader rewrites the status code to be one by way of communication with the NFC chip.

2. The high-frequency-NFC-based product traceability and anti-counterfeiting tag of claim 1, wherein the second coil is an EAS coil.

3. The high-frequency-NFC-based product traceability and anti-counterfeiting tag of claim 1, wherein both the first coil and the second coil are separately formed on the same side of the substrate.

4. The high-frequency-NFC-based product traceability and anti-counterfeiting tag of claim 1, wherein when the second coil is not broken to maintain the closed loop, the IO contact is grounded to form a low level and the NFC reader rewrites the status code to be one by way of communication with the NFC chip, the NFC reader sends a command to the NFC chip 40 to switch an output switch of the IO contact to be a high level and the IO contact disconnects the grounding contact.

5. A high-frequency-NFC-based product traceability and anti-counterfeiting system comprising:
   a product traceability and anti-counterfeiting tag comprising:
   a substrate;
   a first coil formed on the substrate;
   a second coil formed on the substrate; and
   an NFC chip fixed on the substrate;
   wherein a digital signature, product information and a status code whose default value is zero (0) are stored in memory of the NFC chip, the first coil is electrically connected to the NFC chip, the first coil serves as an antenna of the NFC chip, the NFC chip communicates with an NFC reader through the first coil, the NFC reader is capable of reading or writing the status code of the NFC chip through the first coil, the NFC chip has an IO contact and a grounding contact, the IO contact is electrically connected to the grounding contact via the second coil to form a closed loop, the status code keeps at zero (0) when the second coil is not broken to maintain a closed loop, the NFC reader rewrites the status code to be one (1) by way of communication with the NFC chip when the second coil is broken or becomes an open loop, and the status code becomes unwritable after the status code has been rewritten to be one (1);
   an NFC reader, communicating with the NFC chip through the first coil and being capable of reading or writing the status code; and
   a detector for detecting the second coil, and being capable of raising an alarm when the second coil is a closed loop,
   wherein the NFC reader sends a command to the NFC chip to disconnect the second coil to be an open loop when the NFC reader rewrites the status code to be one by way of communication with the NFC chip.

6. The high-frequency-NFC-based product traceability and anti-counterfeiting system of claim 5, wherein the second coil is an EAS coil.

7. The high-frequency-NFC-based product traceability and anti-counterfeiting system of claim 5, wherein both the first coil and the second coil are separately formed on the same side of the substrate.

8. The high-frequency-NFC-based product traceability and anti-counterfeiting system of claim 5, wherein when the second coil is not broken to maintain the closed loop, the IO contact is grounded to form a low level and the NFC reader rewrites the status code to be one by way of communication with the NFC chip, the NFC reader sends a command to the NFC chip to switch an output switch of the IO contact to be a high level and the IO contact disconnects the grounding contact.

* * * * *